United States Patent
Muraoka

(10) Patent No.: US 7,603,116 B2
(45) Date of Patent: Oct. 13, 2009

(54) RADIO BASE STATION APPARATUS AND ITS LOOPBACK TEST METHOD

(75) Inventor: Shinya Muraoka, Tokyo (JP)

(73) Assignees: NEC Corporation, Tokyo (JP); NTT DoCoMo, Inc., Tokyo (JP)

(*) Notice: Subject to any disclaimer, the term of this patent is extended or adjusted under 35 U.S.C. 154(b) by 415 days.

(21) Appl. No.: 10/534,710

(22) PCT Filed: Nov. 12, 2003

(86) PCT No.: PCT/JP03/14393

§ 371 (c)(1),
(2), (4) Date: Oct. 11, 2005

(87) PCT Pub. No.: WO2004/047337

PCT Pub. Date: Jun. 3, 2004

(65) Prior Publication Data

US 2006/0146741 A1 Jul. 6, 2006

(30) Foreign Application Priority Data

Nov. 20, 2002 (JP) ............... 2002-336129

(51) Int. Cl.
G06F 15/16 (2006.01)

(52) U.S. Cl. ............... 455/424; 370/328

(58) Field of Classification Search ............... 455/67.1, 455/67.4, 67.6, 69, 552
See application file for complete search history.

(56) References Cited

U.S. PATENT DOCUMENTS 6,272,322 B1 * 8/2001 Su ............... 455/67.14
6,466,548 B1 * 10/2002 Fitzgerald ............... 370/249
2004/0218665 A1 * 11/2004 Baba et al. ............... 375/221

FOREIGN PATENT DOCUMENTS

| JP | 07-038496 | 2/1995 |
| JP | 10308709 A | 11/1998 |
| JP | 2002-084237 | 3/2002 |

OTHER PUBLICATIONS

The International Search Report, with its English Language Translation, issued for the Parent PCT Application.

* cited by examiner

Primary Examiner—Sam Bhattacharya
(74) Attorney, Agent, or Firm—Dickstein Shapiro LLP

(57) ABSTRACT

A control circuit (1) determines transmission power for a test signal in accordance with the number of call connections of a radio terminal call-connected to the apparatus during a loopback test. The determined transmission power (TSTP) is output to channel circuits (21-2n) used for the transmission of a loopback test signal. The channel circuits (21-2n) adjust the transmission power of the test signal on the basis of the transmission power (TSTP) from the control circuit (1).

12 Claims, 2 Drawing Sheets

RADIO BASE STATION APPARATUS AND ITS LOOPBACK TEST METHOD

BACKGROUND OF THE INVENTION

The present invention relates to a radio base station apparatus and loopback test method and, more particularly, to a radio base station apparatus and its loopback test method which perform a loopback test in which a signal to be exchanged between radio terminals is looped back inside the apparatus.

A radio base station apparatus used in mobile communication such as WCDMA (Wideband Code Division Multiple Access) has a loopback test function of testing the transmission/reception function for a signal to be exchanged between radio terminals. When, for example, the transmission function for a downstream signal to be transmitted from the radio base station apparatus to a radio terminal is to be tested, the downstream signal output from the transmission function is looped back inside the radio base station apparatus, and the looped-back signal is received by the reception function for an upstream signal to be transmitted from the radio terminal to the radio base station apparatus. The normality of the transmission function is then checked on the basis of the reception result. In contrast, when the reception function is to be tested, an upstream signal is output from the transmission function of transmitting a downstream signal, and the looped-back signal obtaining by looping back the downstream signal inside the radio base station apparatus is received by the reception function. The normality of the transmission function is then checked on the basis of the reception result.

In such a loopback test, a looped-back signal which is looped back inside the radio base station apparatus sometimes interferes with an upstream signal actually sent from a radio terminal in the reception function. The interference between the upstream signal and the looped-back signal needs, therefore, to be reduced by decreasing the level of the looped-back signal.

Conventionally, as a radio base station apparatus test method using a test transmitter and receiver (to be referred to as a TTR hereinafter), a technique for reducing such test signal interference has been proposed (see, for example, patent reference 1). In a test using a TTR, a predetermined test signal transmitted from the TTR is received by the radio base station apparatus, and the normality of the reception function of the radio base station apparatus is checked. In contrast, a predetermined test signal returned from the radio base station apparatus is received by the TTR, and the normality of the transmission function of the radio base station apparatus is checked.

In a test using such a TTR, a test signal with a relatively high level which is transmitted from the TTR interferes with an upstream signal from another radio terminal, or a test signal with a relatively high level which is transmitted from the radio base station apparatus interferes with a downstream signal to another radio terminal. For this reason, the lowest bit rate which is used as that of an upstream signal or downstream signal or a lower bit rate is used as that of a test signal transmitted from the TTR or radio base station apparatus. Since a test signal with a low bit rate increases in spreading gain, the transmission quality, i.e., the ratio (Eb/No) of a signal reception energy Eb per bit to a power spectrum density No of the sum of noise and despread interference noise can be improved. Therefore, when the radio base station apparatus or TTR transmits a test signal, the transmission power of the test signal can be reduced by the improvement in Eb/No. This makes it possible to reduce interference with another upstream signal or downstream signal.

In a mobile radio communication system like that based on the WCDMA scheme, in which a plurality of radio terminals are simultaneously call-connected, and the number of radio terminals which can be connected varies depending on the amount of interference, as the amount of interference increases, the number of terminals which can be connected to the radio base station apparatus decreases. For this reason, the transmission power of a TST signal must be set to a low value that has no influence on a general call. In addition, as the number of general calls increases, the quality of a TST signal deteriorates due to the interference between the calls, resulting in errors. TST is for checking normality in a radio base station apparatus, and hence a system designed to cause an error only when apparatus abnormality occurs is preferable. That is, signal deterioration due to such general call interference must be avoided.

In the above conventional technique, since TST transmission power is permanently determined, interference occurs between a TST signal used for a loopback test and a general call. This has influence on the general call and decreases the accuracy of TST. When, for example, TST transmission power is fixed, the SIR (Signal to Interference Ratio: the ratio between a desired signal and an interference noise sum) of a general call and TST is given as follows. Assume that the numbers of call connections are 1 and 64. In this case, if TST signal power Ctst (1)=Ctst (64)=−138 dBm, SIRtst (the ratio between a test signal and an interference noise sum) is given by $$SIRtst = Ctst(64) + 10 \times \log(SF) - 10 \times \log(10^{NO}/10 +$$
$$10^{C1(64)}/10 + 10^{C2(64)}/10 + \ldots + 10^{C64(64)})$$
$$= -12 \text{ dB}$$

The quality represented by this equation is far from being accepted as that for passing a signal.

Assume that call connection count=1, C1(1)=−138 dBm, and Ctst(1)=Ctst(64)=−120 dBm. In this case, SIR1 and SIRtst are given by $$SIR1 = C1(1) + 10 \times \log(SF) - 10 \times \log(10^{NO}/10 + 10^{Ctst(1)}/10)$$
$$= 3 \text{ dB}$$
$$SIRtst = Ctst(1) + 10 \times \log(SF) - 10 \times \log(10^{NO}/10 + 10^{C1(1)}/10)$$
$$= 24 \text{ dB}$$

In this case, since the target SIR value, i.e., TargetSIR=6 dB, the transmission power of the terminal is controlled to be increased by an amount corresponding to the degree to which SIR1 (the ratio between the terminal transmission signal and the interference noise sum) is less than 6 dB. In contrast to this, the TST signal quality becomes higher than necessary. In a loopback test, therefore, as the number of general calls increases, interference with loopback signals increases. As a result, an error occurs in a loopback signal, and the normality of the apparatus cannot be properly changed.

SUMMARY OF THE INVENTION

The present invention has been made to solve the above problems, and has as its object to provide a radio base station apparatus and its loopback test method which can suppress the interference between a TST signal used in a loopback test and a radio terminal corresponding to a general call and execute a proper loopback test.

According to the present invention, there is provided a radio base station apparatus which is used in a mobile radio communication system in which a plurality of radio terminals are simultaneously call-connected and the number of radio terminals which can be connected varies depending on an amount of interference, and exchanges baseband transmission/reception signals with an external radio device which performs radio communication with the radio terminals, comprising a plurality of channel circuits which are respectively provided for radio channels used in the mobile radio communication system, convert transmission data, which are to be transmitted to radio terminals call-connected through the radio channels, into baseband transmission signals, output the signals to the external radio device with arbitrary transmission power, and output baseband reception signals from the external radio device as reception data from the radio terminals, loopback test means for testing a transmission function or a reception function of an arbitrary channel circuit by looping back a predetermined test signal, inside the apparatus, which is output from a transmitting-side channel circuit, of the channel circuits, which serves as a transmitting side in a loopback test, and by receiving the test signal through a receiving-side channel circuit of the channel circuits which serves as a receiving side in the loopback test, and a control unit which determines transmission power for the test signal in accordance with the number of call connections of a radio terminal call-connected to the apparatus in the loopback test, and indicates the transmission power to the transmitting-side channel circuit.

In this case, when determining transmission power, the control unit may increase/decrease the transmission power of the test signal in accordance with an increase/decrease in the number of call connections. When determining transmission power for a test signal, the control unit may select, as the transmission power, transmission power which satisfies, at least at the time of the number of call connections, a ratio between the test signal and an interference noise sum (SIR: Signal to Interference Ratio) which is obtained when the transmission power of the test signal is made equal to that of a radio terminal of interest when the number of call connections is 1.

A specific example of the arrangement of the loopback test means may include a test data generating circuit which supplies test data used for a loopback test to the transmitting-side channel circuit, a selection circuit which loops back the test signal, as a reception signal, from the transmitting-side channel circuit to the receiving-side channel circuit on the basis of the test data, and a test data comparison circuit which compares the test data supplied from the test data generating circuit with reception data of the test signal output from the receiving-side channel circuit.

A specific example of the arrangement for transmission power control in a channel circuit may include a power control circuit which adjusts transmission power of a transmission signal to the radio terminal in accordance with a request bit multiplexed on reception data from the radio terminal, a bit multiplexing circuit which multiplexes an instruction bit, which instructs the radio terminal to adjust transmission power, on transmission data to the radio terminal on the basis of a ratio between a reception signal from the radio terminal and an interference noise sum (SIR: Signal to Interference Ratio), and a test signal power control circuit which adjusts the transmission power of the test signal in accordance with an instruction from the control circuit.

According to the present invention, there is provided a radio base station apparatus loopback test method which tests a transmission function or a reception function of a radio base station apparatus by transmitting/receiving a predetermined test signal upon looping back a signal inside the radio base station apparatus, the loopback test method being used in a mobile radio communication system in which a plurality of radio terminals are simultaneously call-connected and the number of radio terminals which can be connected varies depending on an amount of interference and exchanges baseband transmission/reception signals with an external radio device which performs radio communication with the radio terminals, comprising the step of testing the transmission function or the reception function of the apparatus by transmitting/receiving a predetermined test signal upon looping back the signal inside the apparatus, the step of determining transmission power for the test signal in accordance with the number of call connections of a radio terminal in the radio base station apparatus, and the step of adjusting the transmission power of the test signal on the basis of the transmission power.

The step of determining the transmission power may include the step of increasing/decreasing the transmission power of the test signal in accordance with an increase/decrease in the number of call connections. More specifically, this step may include the step of selecting, as the transmission power, transmission power which satisfies, at least at the time of the number of call connections, a ratio between the test signal and an interference noise sum (SIR: Signal to Interference Ratio) which is obtained when the transmission power of the test signal is made equal to that of a radio terminal of interest when the number of call connections is 1.

Another specific example of the step of determining the transmission power may include the step of using, as the transmission power of the test signal, transmission power of a transmission signal transmitted to the radio terminal when the number of call connections is 1, when the number of call connections is less than 16, or may include the step of using, as the transmission power of the test signal, power obtained by adding 1 dB to transmission power of a transmission signal which is transmitted to the radio terminal when the call connection count is 1, when the number of call connections is not less than 16 and less than 32. Alternatively, this step may include the step of using, as the transmission power of the test signal, power obtained by adding 3 dB to transmission power of a transmission signal which is transmitted to the radio terminal when the call connection count is 1, when the number of call connections is not less than 32 and less than 64, or may include the step of using, as the transmission power of the test signal, power obtained by adding 18 dB to transmission power of a transmission signal which is transmitted to the radio terminal when the call connection count is 1, when the number of call connections is not less than 64.

DETAILED DESCRIPTION OF EMBODIMENTS

Arrangement of Radio Base Station Apparatus

Figure 1:
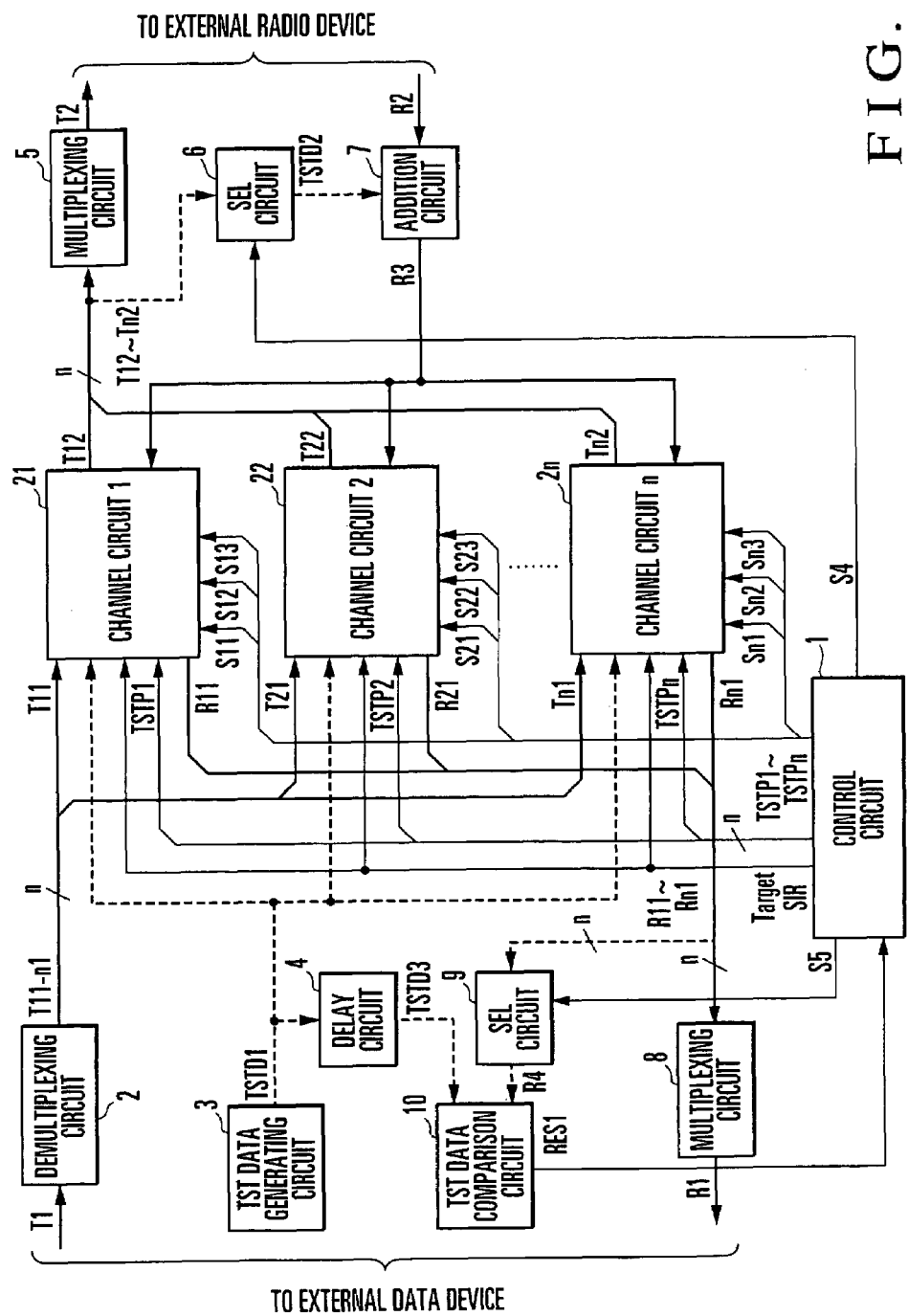
FIG. 1 is a block diagram showing the arrangement of a radio base station apparatus according to an embodiment of the present invention.

FIG. 1 is a block diagram showing the arrangement of a radio base station apparatus according to an embodiment of the present invention. This radio base station apparatus is an apparatus which converts transmission data T1 from an external data device (not shown), on which data from users who perform data communication with radio terminals are multiplexed, into a baseband transmission signal T2 on which downstream signals from the respective radio terminals are multiplexed, and outputs the signal to the external radio device (not shown). In addition, this apparatus converts a baseband reception signal R2 from the external radio device, on which upstream signals from the respective radio terminals are multiplexed, into reception data R1 on which data corresponding to the respective users are multiplexed, and outputs the data to the external data device.

The radio base station apparatus is provided with channel circuits 21 to 2n (n>2) corresponding to a plurality of users, and can simultaneously call-connect to n radio terminals. In TST (loopback test), the apparatus can call-connect to (n−2) radio terminals. In addition to the channel circuits 21 to 2n, the radio base station apparatus is provided with a control circuit 1, demultiplexing circuit 2, TST data generating circuit 3, delay circuit 4, multiplexing circuit 5, SEL circuit 6, addition circuit 7, multiplexing circuit 8, SEL circuit 9, and TST data comparison circuit 10.

The control circuit 1 is formed from a microprocessor such as a CPU, and controls each component of the radio base station apparatus by executing a predetermined program. In this case, the control circuit 1 controls the channel circuits 21 to 2n by outputting, to them, control signals such as mode signals S11, S12, S13 to Sn1, Sn2, and Sn3 for indicating the operation modes (normal/TST) of the corresponding channel circuits, TST transmission power signals TSTP1 to TSTPn for indicating optimal TST transmission powers calculated from the current call connection counts with respect to the corresponding channel circuits, and upstream SIR1 to SIRn (to be referred to as TargetSIR: Signal to Interference Ratio/the ratio between a desired signal and an interference noise sum) for indicating references for transmission power control with respect to general calls.

Note that the radio base station apparatus according to this embodiment, like a WCDMA apparatus, is based on the premise that the apparatus is used in a mobile communication system in which a plurality of radio terminals are simultaneously call-connected, and the number of radio terminals which can be connected varies depending on the amount of interference. Therefore, closed-loop transmission power control is always performed between the radio base station apparatus and each radio terminal so as to make upstream reception SIR converge to TargetSIR. For this reason, signal levels from the respective radio terminals which are contained in a reception signal in the radio base station apparatus are constant.

The demultiplexing circuit 2 is a circuit unit which demultiplexes the transmission data T1, which is set from the external data device and on which data corresponding to a plurality of users are multiplexed, into data T11 to Tn1 for the respective users, and supplies them to the respective channel circuits. The TST data generating circuit 3 is a circuit unit which generates TST data TSTD1 at the time of TST, and supplies it to each channel circuit and delay circuit 4. The multiplexing circuit 5 codes and multiplexes spread downstream TST signals T12 to Tn2 from the channel circuits 21 to 2n, and transmits the resultant transmission signal T2 to the external radio device. The external radio device converts the transmission signal T2 into a radio signal and transmits it to each terminal through an antenna. The SEL circuit 6 is a circuit unit which selects one of the upstream or downstream TST signals T12 to Tn2 from the channel circuits 21 to 2n in accordance with a selection signal S4 set by the control circuit 1, and outputs the selected signal as a loopback signal TSTD2 to the addition circuit 7. The addition circuit 7 is a circuit unit which adds the loopback signal TSTD2 and the reception signal R2 which is obtained by converting the signal, obtained by spatially multiplexing upstream signals transmitted from the respective radio terminals, into the baseband signal by the external radio device, and supplies a resultant reception signal R3 to each of the channel circuits 21 to 2n.

The channel circuit 21 is a circuit unit which operates in one of modes including a normal mode, upstream TST transmission mode, downstream TST transmission mode, and downstream TST reception mode in accordance with the mode signals S11 to S13 from the control circuit 1. In normal operation, the channel circuit 21 transmits the downstream signal T12 obtained by coding and spreading the data T11 to the multiplexing circuit 5 on the subsequent stage, while despreading and decoding the reception signal R3 from the addition circuit 7 and outputting obtained data R11 to Rn1 to the multiplexing circuit 8. In the upstream TST transmission mode, the channel circuit 21 codes the TST data TSTD1 from the TST data generating circuit 3 as an upstream signal in a predetermined format, amplifies or attenuates the signal output with the power value TSTP1 set by the control circuit 1, spreads the signal, and supplies the resultant output T12 to the SEL circuit 6. In the downstream TST transmission mode, the channel circuit 21 operates in the same manner as in the upstream TST transmission mode except that the signal format differs from that for upstream TST. In the downstream TST reception mode, the channel circuit 21 despreads and decodes the input reception signal R3 by a predetermined scheme, and outputs the obtained data R11 to Rn1 to the SEL circuit 9. Note that the remaining channel circuits 22 to 2n operate in the same manner as described above.

The SEL circuit 9 is a circuit unit which selects one of the data R11 to Rn1 in accordance with a selection signal S5 from the control circuit 1, and transmits it as reception TST data R4 to the TST data comparison circuit 10. The delay circuit 4 is a circuit unit which delays the TST data TSTD1 by a time corresponding to the interval between the instant at which TST data is generated and the instant at which the data is looped back, and transmits obtained original data TSTD3 to the TST data comparison circuit 10. The TST data comparison circuit 10 is a circuit unit which compares the original data TSTD3 with the reception TST data R4, and informs the control circuit 1 of the result indicating whether or not they coincide with each other.

[Arrangement of Channel Circuit]

Figure 2:
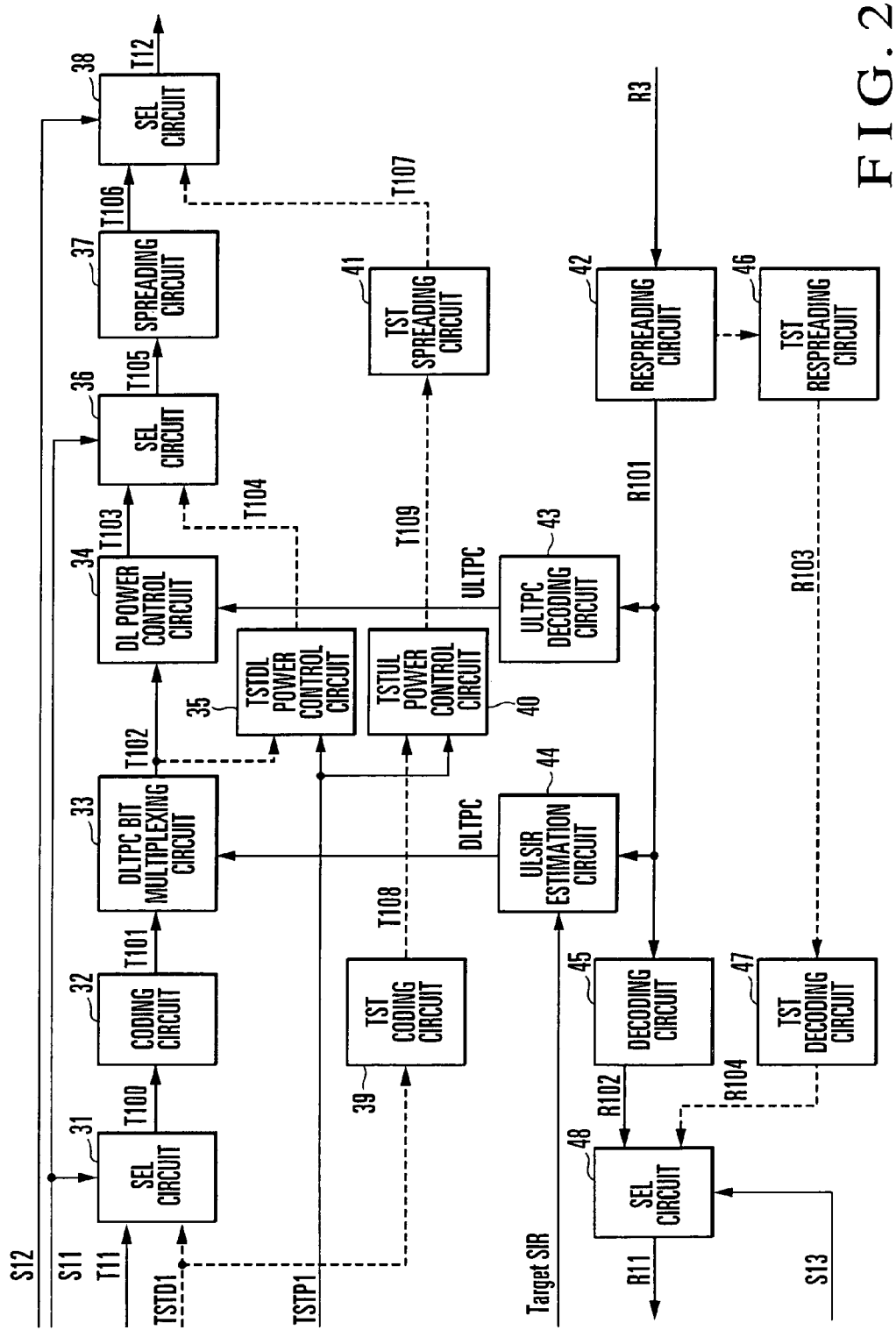
FIG. 2 is a block diagram showing the internal arrangement of a channel circuit.

The internal arrangement of the channel circuit 21 will be described next. FIG. 2 is a block diagram showing the internal arrangement of the channel circuit 21. Note that the remaining channel circuits 22 to 2n have the same arrangement as that of the channel circuit 21, and hence a detailed description thereof will be omitted. The channel circuit 21 is provided with a SEL circuit 31, coding circuit 32, DLTPC bit multiplexing circuit 33, DL power control circuit 34, TSTDL power control circuit 35, SEL circuit 36, spreading circuit 37, SEL circuit 38, TST coding circuit 39, TSTUL power control circuit 40, TST spreading circuit 41, despreading circuit 42, ULTPC decoding circuit 43, ULSIR estimation circuit 44, decoding circuit 45, TST despreading circuit 46, TST decoding circuit 47, and SEL circuit 48.

The arrangement and basic arrangement of the transmitting side of the channel circuit 21 will be described first. In accordance with the mode signal S11 from the control circuit 1, the SEL circuit 31 selects the data T11 when the normal mode is set, and selects the TST data TSTD1 when the upstream/downstream TST transmission mode is set. The SEL circuit 31 then outputs the selected data as data T100 to the coding circuit 32. The coding circuit 32 outputs the data T100 in a predetermined downstream signal format as data 101.

This radio base station apparatus is based on the premise that closed-loop transmission power control is performed both in the upstream and downstream directions, and the reception SIRs in the radio base station apparatus and a radio terminal are kept constant. The DLTPC bit multiplexing circuit 33 multiplexes, on the data T101, a DLTPC bit indicating whether to increase (1) or decrease (0) the upstream transmission power of the radio terminal. The DL power control circuit 34 controls the downstream transmission power in accordance with the ULTPC bit indicating whether to increase (1) or decrease (0) the downstream transmission power of the radio terminal (to be described later). In contrast to this, the TSTDL power control circuit 35 performs transmission with the transmission power indicated by TSTP1 set by the control circuit 1. In accordance with the mode signal S11 from the control circuit 1, the SEL circuit 36 selects T103 when the normal mode is set, and selects T104 when the upstream/downstream TST transmission mode is set. The SEL circuit 36 then outputs the selected output to the spreading circuit 37. The spreading circuit 37 spreads T105 as a downstream signal into a predetermined format, and transmits the result to the SEL circuit 38. The SEL circuit 38 selects T107 (to be described later) when the upstream TST transmission mode is set, and selects T106 when the downstream normal transmission mode or the upstream TST transmission mode is set, in accordance with the mode signal S12 from the control circuit 1. The SEL circuit 38 then transmits the result as T12. The TST coding circuit 39 codes TSTD1 as an upstream signal in a predetermined format. The TSTUL power control circuit 40 transmits T108 with the power set by TSTP1. The TST spreading circuit 41 spreads the received signal as an upstream signal in a predetermined format, and transmits a result T107 to the SEL circuit 38.

The arrangement and basic operation of the receiving side of the channel circuit 21 will be described next. The despreading circuit 42 despreads R3 as an upstream signal in a predetermined format, and extracts user data to be received. The ULTPC decoding circuit 43 supplies, to the DL power control circuit 34, the upstream TPC bit ULTPC transmitted from a terminal and is contained in R101. The ULSIR estimation circuit 44 estimates the SIR of R101, compares the SIR with TargetSIR1 supplied from the control circuit 1 in FIG. 1, and transmits the result as DLTPC to the DLTPC bit multiplexing circuit 33 described above. The polarity of DLTPC is set as follows. If the estimated SIR is higher than TargetSIR1, DLTPC=0 is set to request the terminal to decrease the upstream power. If the SIR is lower than TargetSIR1, DLTPC=1 is set. The decoding circuit 45 decodes R101 as an upstream signal in a predetermined format. The TST despreading circuit 46 despreads R3 as a downstream signal in a predetermined format. The TST decoding circuit 47 decodes R103 as a downstream signal in a predetermined format, and transmits a result R104 to the SEL circuit 48. The SEL circuit 48 selects R104 when the downstream TST reception mode is set, and selects R102 in other cases, in accordance with S13. The SEL circuit 48 then transmits the result as R11.

[Operation of Radio Base Station Apparatus]

The TST (loopback test) operation of the radio base station apparatus according to this embodiment will be described next with reference to FIG. 1. A loopback test with respect to the reception function of the radio base station apparatus (to be referred to as upstream TST hereinafter) will be described below. It is an object of upstream TST to check the state of the receiving side of a channel circuit. For this object, an upstream signal must be transmitted from an arbitrary channel circuit. A specific example of this operation will be described below by using
    upstream TST signal transmission circuit: channel circuit 21, and
    upstream TST circuit to be tested: channel circuit 22.

In this case, the operation is directed to check the normality of the receiving side of the channel circuit 22. Therefore, the channel circuit 21 performs upstream TST operation, and the channel circuit 22 performs normal operation. The channel circuit 21 codes and spreads TSTD1 while neglecting the input signal T11, and transmits the result to the SEL circuit 6. The transmission power used in this case conforms to TSTP1. The control circuit 1 performs setting with S4 to make the SEL circuit 6 select T12. With this operation, the addition circuit 7 adds the output TSTD2 from the SEL circuit 6 to R2 in which an upstream signal transmitted from each terminal is contained. The resultant signal is supplied as the signal R3 to all the channel circuits.

The channel circuit 22 despreads and decodes the signal R3 to output a signal R21 to the SEL circuit 9. The control circuit 1 supplies setting S5 to make the SEL circuit 9 select R21, and the SEL circuit 9 outputs R21 as R4 to the TST data comparison circuit 10. The TST data comparison circuit 10 then compares TSTD3 with R4, and notifies the control circuit 1 of the result indicating whether or not the data coincide with each other, thereby checking the normality of the receiving-side circuit of the channel circuit 22. The same applies to a case wherein an upstream TST circuit to be tested is realized by any one of the channel circuits 21 and 23 to 2n.

A loopback test with respect to the transmission function of the radio base station apparatus (to be referred to as downstream TST hereinafter) will be described next. This operation is directed to check the normality of the transmitting side of the channel circuit 21. Both the channel circuits 21 and 22 perform downstream TST operation.
    downstream TST circuit to be tested: channel circuit 21
    downstream TST reception circuit: channel circuit 22

The channel circuit 21 codes and spreads the input signal TSTD1 and outputs T12. As in the case of upstream TST, T12 is input to all the channel circuits through the SEL circuit 6 and addition circuit 7. The channel circuit 22 despreads and decodes the signal R3 and outputs the result R21. Subsequent operation is the same as that in upstream TST. The same applies to a case wherein a downstream TST circuit is realized by any one of the channel circuits 21 and 23 to 2n.

The TST transmission power control operation of the control circuit 1 will be described next. This embodiment is premised on a mobile radio communication system like a WCDMA system in which a plurality of radio terminals are call-connected, and the number of radio terminals which can be connected varies depending on the amount of interference. Therefore, since closed-loop transmission power control is always performed between the radio base station apparatus and a radio terminal so as to make the upstream reception SIR converge to TargetSir, the signal levels from the respective radio terminals which are contained in the signal R2 are constant. A case wherein TST is performed concurrently with general call connection will be described below.

When call connection count=1, upstream SIR1 of the signal transmitted from radio terminal #1 can be obtained by $$SIR1=C1(1)+10\times\log(SF)-10\times\log(10^{N0}/10+Ctst) \quad (1)$$

where $C1(n)$ is the level of signal power from radio terminal #1 which is contained in the signal R2 when call connection count=n, Ctst(n) is the power level of the TST signal TSTD2, SF is a band expansion ratio, and N0 is the level of noise produced in the radio base station apparatus. As is obvious from equation (1), when call connection count=1, since a TST signal interferes with an upstream signal from radio terminal #1, the signal power $C1(1)$ must be increased accordingly. Assume that TargetSIR=SIR=6 dB, N0=−120 dBm, SF=256, and $C1(1)=Ctst(1)$. In this case, $C1(1)=Ctst(1)=-138$ dBm. If the TST signal SIR of the channel circuit 22 (to be tested) is represented by SIRtst, SIRtst=SIR1.

When radio terminals #1 to #16 are call-connected (call connection count=16), the radio terminals interfere with each other. In order to hold TargetSIR, interference N by other radio terminals represented by the equation (2) must be added as noise represented by equation (1) to obtain SIR1 by equation (3). As described above, in the radio base station apparatus, transmission power control is used to make the upstream SIRs from all terminals converge to the same TargetSIR, and hence C2(16), C3(16), ..., C16(16) of equation (2) become almost the same value.

$$N=10\times\log(10^{C2(16)}+10^{C3(16)}+\ldots+10^{C16(16)}) \quad (2)$$

By using the interference N obtained in this manner, when call connection count=16, the upstream SIR1 of a signal transmitted from radio terminal #1 can be obtained by $$SIR1=C1(16)+10\times\log(SF)-10\times\log(10^{N0}/10+10^{N}/10+ \\ Ctst(16)) \quad (3)$$

Since SIR1 must be set to the same value given by equation (1), signal power C1(16) in equation (3) must be increased by an amount corresponding to an increase in interference. In this case, upstream signal power Cm (m=1, 2, ..., 16) from each radio terminal is Cm(16)≈−137 dBm, and converges to SIRm=6 dB. In addition, since upstream signal power Cm(16) increases, in order to prevent a deterioration in the quality of a TST signal, Ctst(16) must be set to be higher than Ctst(1) by about 1 dB as indicated by equation (4) as in the above case.

$$Ctst(16)=Ctst(1)+1=-137 \text{ dBm} \quad (4)$$

Likewise, considering the cases of n=32 and 64, $C1(n)$ and Ctst(n) are given below by equations (5) and (6), respectively:

$$C1(32)=-135 \text{ dBm}, Ctst(32)=-135 \text{ dBm} \quad (5)$$

$$C1(64)=-120 \text{ dBm}, Ctst(32)=-120 \text{ dBm} \quad (6)$$

In this case, although TST signal power Ctst(64) is considerably higher than Ctst(1), since Ctst(64) is equal to the power set when call connection count=64, no considerable problem arises because an increase in interference with a general call due to a TST signal is 0.1 dB.

As described above, the upstream TST transmission power TSTP1 set in the channel circuit 21 by the control circuit 1 is set on the basis of Table 1 given below.

TABLE 1

| Call Connection | TSTP1 |
|---|---|
| n < 16 | C1(1) |
| 16 ≦ n < 32 | C1(1) + 1 dB |
| 32 ≦ n < 64 | C1(1) + 3 dB |
| 64 ≦ n | C1(1) + 18 dB |

Changing the TST transmission power in accordance with the number of call connections for general calls in this manner makes it possible to prevent a deterioration in the quality of a TST signal while minimizing the amount of interference of the TST signal with a general call. When TST is to be performed by using each of the channel circuits 22 to 2n, transmission power control similar to that for the channel circuit 21 described above is performed. In addition, control for a downstream TST signal is performed in the same manner as for the above upstream TST.

The internal operation of the channel circuit 21 in FIG. 1 will be described next with reference to FIG. 2.

S11, S12, and S13 set by the control circuit 1 at the time of normal operation, upstream TST transmission, downstream TST transmission, and downstream TST reception are used to perform selection like that indicated by Table 2. Note that "ANY" takes an arbitrary value.

TABLE 2

|  | S11 | S12 | S12 |
|---|---|---|---|
| Normal | T11 → T100 | T106 → T12 | R102 → R11 |
| Upstream TST Transmission | TSTD1 → T100 | T106 → T12 | ANY |
| Downstream TST Transmission | ANY | T107 → T12 | ANY |
| Downstream TST Reception | ANY | ANY | R104 → R11 |

In normal operation, the channel circuit 21 codes and spreads T11 input from the external data device, and outputs the output T12 to the multiplexing circuit 5 in FIG. 1. The transmission power at this time is controlled by the DL power control circuit 34. In this case, closed-loop downstream transmission power control is performed. The ULTPC decoding circuit 43 decodes the ULTPC bit in which control information required by the terminal side is written. If a transmission power increase request is issued from the terminal, "1" is supplied to the DL power control circuit 34. If a transmission power decrease request is issued, "0" is supplied to the DL power control circuit 34. When receiving the transmission power increase request, the DL power control circuit 34 sets power higher than the immediately preceding power by a predetermined level. When receiving the transmission power decrease request, the DL power control circuit 34 sets low power. The receiving side despreads and decodes the signal R3 in which the upstream signal sent from the terminal is contained, and transmits the result R11 to the external data terminal.

When the channel circuit 21 is to perform upstream TST transmission, the channel circuit 21 codes and spreads the data TSTD1 supplied from the TST data generating circuit 3, and supplies the resultant output T12 to the SEL circuit 6. Transmission power control at this time is performed by the TSTUL power control circuit 40. The power value set at this time is TSTP1 supplied from the control circuit 1. The channel circuit 21 performs downstream TST transmission in the same manner as the upstream TST transmission described above except that transmission power control is performed by the TSTDL power control circuit 35. The power at this time is also TSTP1.

When the channel circuit 21 is to perform downstream TST reception, the channel circuit 21 performs TST despreading and TST decoding of the signal R3 in which the downstream TST signal transmitted from another channel circuit is contained, and transfers the result as R11 to the TST data comparison circuit 10. With this operation, with respect to a general call, downstream transmission power from the radio base station apparatus to the radio terminal is controlled by closed-loop transmission control between the radio base station apparatus and the radio terminal. In contrast, at the time of TST, power for upstream and downstream TST transmission is controlled by the transmission power TSTP1 determined by the control circuit 1.

As described above, in this embodiment, each channel circuit is provided with the TSTDL power control circuit 35 and TSTUL power control circuit 40 which adjust the transmission power of a test signal, the control circuit 1 determines transmission power for a test signal in accordance with the number of call connections of a radio terminal call-connected to the apparatus at the time of a loopback test, and the transmission power is indicated to the TSTDL power control circuit 35 or TSTUL power control circuit 40 for the channel circuit which is used for the loopback test. This makes it possible to suppress interference between a general call and a TST signal used for a loopback test, thus executing a proper loopback test.

When transmission power is to be determined, the transmission power of a test signal may be increased/decreased in accordance with an increase/decrease in the number of call connections. More specifically, as the transmission power of a test signal, transmission power may be selected, which satisfies, at least at the time of the number of call connections, the ratio between the test signal and an interference noise sum (SIR: Signal to Interference Ratio) which is obtained when the transmission power of the test signal is made equal to that of a radio terminal of interest when the number of call connections is 1. This makes it possible to minimize the amount of interference which a test signal causes to an upstream reception signal of a general call and a deterioration in the quality of the test signal due to interference caused by the general call even if the interference amount from a radio station to a test signal changes depending on the number of call connections. Therefore, a loopback test can be performed with high accuracy.

As has been described above, the present invention is provided with a transmission power adjusting unit which adjusts the transmission power of a test signal, a control unit determines transmission power for a test signal in accordance with the number of call connections of a radio terminal call-connected to the apparatus at the time of a loopback test, and the transmission power is indicated to a TSTDL power control circuit or TSTUL power control circuit for each channel circuit which is used for the loopback test. This makes it possible to suppress the interference between a general call and a TST signal used for a loopback test and execute a proper loopback test.

The invention claimed is:

1. A radio base station apparatus which is used in a mobile radio communication system in which a plurality of radio terminals are simultaneously call-connected and the number of radio terminals which can be connected varies depending on an amount of interference, and exchanges baseband transmission/reception signals with an external radio device which performs radio communication with the radio terminals, characterized by comprising:

a plurality of channel circuits which are respectively provided for radio channels used in the mobile radio communication system, convert transmission data, which are to be transmitted to radio terminals call-connected through the radio channels, into baseband transmission signals, output the signals to the external radio device with arbitrary transmission power, and output baseband reception signals from the external radio device as reception data from the radio terminals;

loopback test means for testing a transmission function or a reception function of an arbitrary channel circuit by looping back a predetermined test signal, inside the apparatus, which is output from a transmitting-side channel circuit, of said channel circuits, which serves as a transmitting side in a loopback test, and by receiving the test signal through a receiving-side channel circuit of said channel circuits which serves as a receiving side in the loopback test; and a control unit which determines transmission power for the test signal in accordance with the number of call connections of a radio terminal call-connected to said apparatus in the loopback test, and indicates the transmission power to said transmitting-side channel circuit.

2. The radio base station apparatus according to claim 1, characterized in that said control unit increases/decreases the transmission power of the test signal in accordance with an increase/decrease in the number of call connections, when the transmission power is determined.

3. The radio base station apparatus according to claim 1, characterized in that in determining transmission power for the test signal, said control unit selects, as the transmission power, transmission power which satisfies, at least at the time of the number of call connections, a ratio between the test signal and an interference noise sum (SIR: Signal to Interference Ratio) which is obtained when the transmission power of the test signal is made equal to that of a radio terminal of interest when the number of call connections is 1.

4. The radio base station apparatus according to claim 1, characterized in that said loopback test means comprises:

a test data generating circuit which supplies test data used for a loopback test to said transmitting-side channel circuit;

a selection circuit which loops back the test signal, as a reception signal, from said transmitting-side channel circuit to said receiving-side channel circuit on the basis of the test data; and a test data comparison circuit which compares the test data supplied from said test data generating circuit with reception data of the test signal output from said receiving-side channel circuit.

5. The radio base station apparatus according to claim 1, characterized in that said channel circuit comprises:

a power control circuit which adjusts transmission power of a transmission signal to the radio terminal in accordance with a request bit multiplexed on reception data from the radio terminal;

a bit multiplexing circuit which multiplexes an instruction bit, which instructs the radio terminal to adjust transmission power, on transmission data to the radio terminal on the basis of a ratio between a reception signal from the radio terminal and an interference noise sum (SIR: Signal to Interference Ratio); and a test signal power control circuit which adjusts the transmission power of the test signal in accordance with an instruction from said control circuit.

6. A radio base station apparatus loopback test method which tests a transmission function or a reception function of a radio base station apparatus by transmitting/receiving a predetermined test signal upon looping back the signal inside the radio base station apparatus, said loopback test method being used in a mobile radio communication system in which a plurality of radio terminals are simultaneously call-connected and the number of radio terminals which can be connected varies depending on an amount of interference and exchanges baseband transmission/reception signals with an external radio device which performs radio communication with the radio terminals, characterized by comprising:

the step of testing the transmission function or the reception function of the apparatus by transmitting/receiving a predetermined test signal upon looping back the signal inside the apparatus;

the step of determining transmission power for the test signal in accordance with the number of call connections of a radio terminal in the radio base station apparatus; and the step of adjusting the transmission power of the test signal on the basis of the transmission power.

7. The radio base station apparatus loopback test method according to claim 6, characterized in that the step of determining the transmission power comprises the step of increasing/decreasing the transmission power of the test signal in accordance with an increase/decrease in the number of call connections.

8. The radio base station apparatus loopback test method according to claim 6, characterized in that the step of determining the transmission power comprises the step of selecting, as the transmission power, transmission power which satisfies, at least at the time of the number of call connections, a ratio between the test signal and an interference noise sum (SIR: Signal to Interference Ratio) which is obtained when the transmission power of the test signal is made equal to that of a radio terminal of interest when the number of call connections is 1.

9. The radio base station apparatus loopback test method according to claim 6, characterized in that the step of determining the transmission power comprises the step of using, as the transmission power of the test signal, transmission power of a transmission signal transmitted to the radio terminal when the number of call connections is 1, when the number of call connections is less than 16.

10. The radio base station apparatus according to claim 6, characterized in that the step of determining the transmission power comprises the step of using, as the transmission power of the test signal, power obtained by adding 1 dB to transmission power of a transmission signal which is transmitted to the radio terminal when the call connection count is 1, when the number of call connections is not less than 16 and less than 32.

11. A radio base station apparatus loopback back method, characterized in that a step of determining transmission power comprises a step of using, as the transmission power of a test signal, power obtained by adding 3 dB to transmission power of a transmission signal which is transmitted to a radio terminal when a call connection count is 1, when a number of call connections is not less than 32 and less than 64.

12. A radio base station apparatus loopback back method, characterized in that a step of determining transmission power comprises a step of using, as the transmission power of a test signal, power obtained by adding 18 dB to transmission power of a transmission signal which is transmitted to a radio terminal when a call connection count is 1, when a number of call connections is not less than 64.

* * * * *